Figures 1, 2:
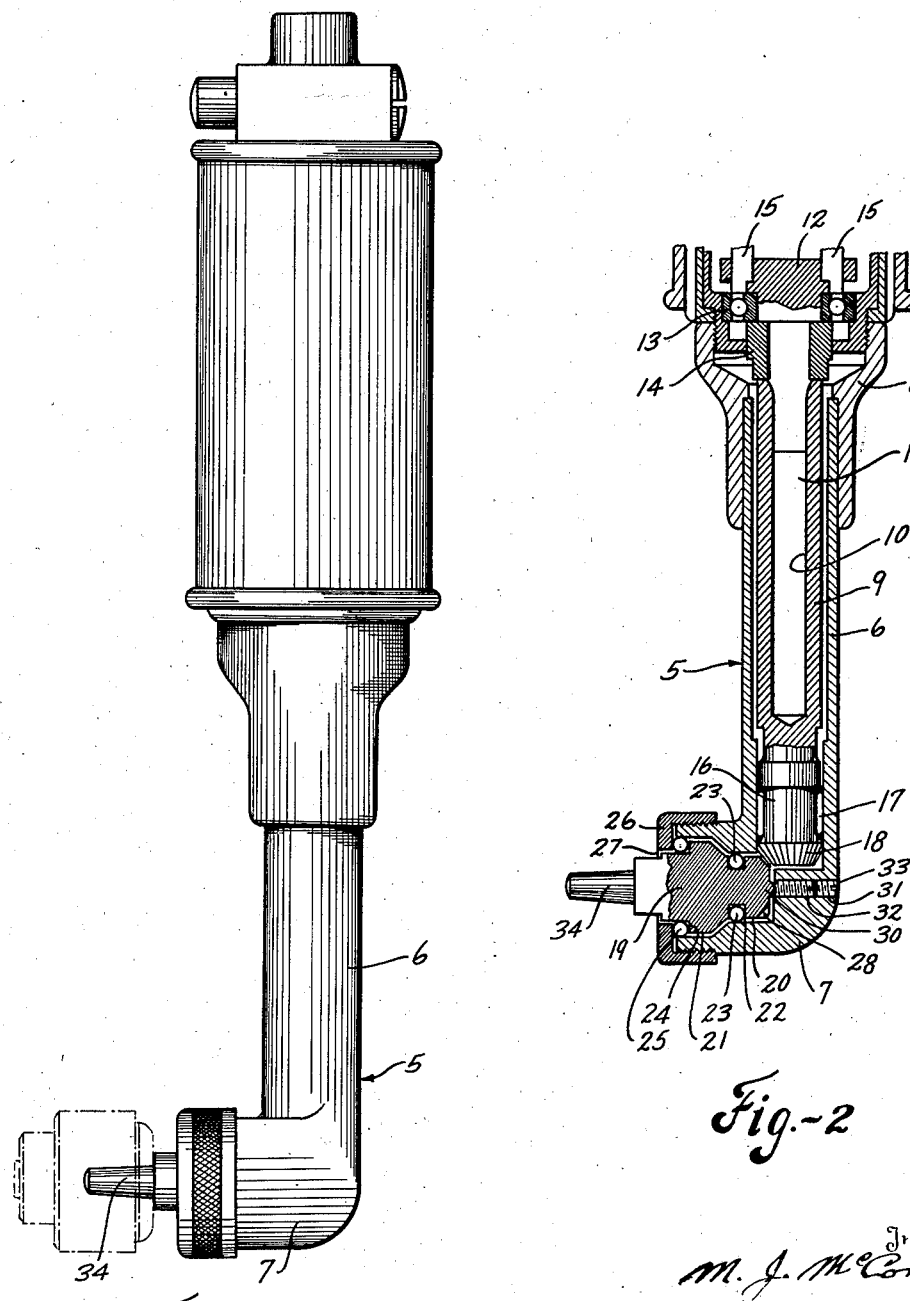

May 18, 1943. M. J. McCOMBS 2,319,465
ANGLE HEAD
Filed Feb. 5, 1941

Inventor
M. J. McCombs
By Emmet f. Reed.
Attorney

Patented May 18, 1943

2,319,465

UNITED STATES PATENT OFFICE 2,319,465

ANGLE HEAD

Melvorne J. McCombs, Dayton, Ohio, assignor to The Buckeye Tools Corporation, a corporation of Ohio Application February 5, 1941, Serial No. 377,533

2 Claims. (Cl. 74—423)

This invention relates to an angle head for tools of the type in which the working element rotates on an axis at an angle to the axis of the driving shaft. Angle heads of this general type have been used heretofore but have not been entirely satisfactory for various reasons, such as the excessive friction developed in use, the heavy pressure exerted by the driven pinion on the driving pinion when the working element is pressed forcibly against the work, and, in some cases at least, because of high cost.

One object of the invention is to provide an angle head of such a character that friction therein will be negligible.

A further object of the invention is to provide such an angle head in which the thrust on the driven member will be so controlled as to prevent pressure thereby on the driving member.

A further object of the invention is to provide such an angle head in which the thrust receiving element can be readily renewed when worn to such an extent as to cause friction.

A further object of the invention is to provide an angle head of simple construction and high efficiency which can be produced at a low cost.

Other objects of the invention may appear as the device is described in detail.

In the accompanying drawing Fig. 1 is an elevation of a power driven tool equipped with my improved angle head; and Fig. 2 is a longitudinal sectional view taken through the angle head and through a portion of the driving mechanism.

In the drawing I have illustrated one embodiment of my invention and have shown the same as connected with a motor driven tool but it will be understood that the angle head may take various forms and may be driven from any suitable source of power.

In the particular construction illustrated the angle head as a whole comprises a supporting structure which is preferably in the form of a casing 5 including two tubular portions 6 and 7 arranged at an angle one to the other, and in the present arrangement the tubular portion 6 of the casing is of a length substantially greater than the portion 7. The two tubular portions are arranged at right angles one to the other. It will be obvious, however, that the relative lengths of the two tubular portions of the casing and the angle at which they are connected one with the other may be varied as desired. The tubular portion 6 of the casing, in the arrangement here shown, is rigidly connected at its outer end with a casing 8 which encloses the motor and power transmitting mechanism. Mounted in the tubular portion 6 of the casing is a driving shaft which may be of any suitable construction and is here shown as a two part shaft comprising an inner portion 9 having a longitudinal bore 10 in which the outer portion 11 is mounted and rigidly secured. The outer portion 11 of the shaft extends into the casing 8 where it is provided with a head 12 which is supported on a ball bearing 13 which prevents the inward axial movement of the shaft as a whole, and a nut 14, confined between the bearing and the outer portion 9 of the shaft, prevents the outward movement of the shaft. The driving shaft is connected with a motor of any suitable kind mounted in the casing not here shown, by means of suitable power transmitting mechanism which, in the present instance, is in the form of planetary gearing and the vertical members 15 of the planetary gearing cage extend through openings in the head 12 of the shaft to connect the latter with the gearing. This specific driving mechanism is peculiar to the particular tool to which the angle head is applied and it will be understood that the shaft may be connected with the motor in any suitable manner, and that it is not necessary that the motor should be contained in and form a part of the tool itself.

An inner portion 9 of the driving shaft is provided near its inner end with a circumferential race 16 in which are mounted anti-friction rollers 17 which contact with the surrounding wall of the casing. A beveled pinion 18 is secured to the inner end of the shaft for rotation therewith and is here shown as formed integral with the inner portion of the shaft. The shaft being held against axial movement it will be obvious that the pinion 18 rotates in a fixed position with relation to the casing.

The driven member 19 is rotatably mounted in the shorter tubular member 7 of the casing. This driven member may take various forms and may be mounted in the casing in various ways. As here shown the tubular portion 7 of the casing is provided with an inner portion 20 having a relatively small internal diameter and with an outer portion 21 having a relatively large internal diameter. The driven member 19 is similarly shaped so as to correspond approximately to the internal diameters of the tube 7. The inner or small diameter portion of the driven member is provided with a ball race 22 in which are mounted bearing balls 23 which have bearing contact with the small diameter wall of the tube. The large diameter portion of the driven member is provided with a ball recess 24 in which are mounted bearing balls 25 which contact with the large diameter wall of the tube and also with a closure 26 for the outer end of the tube, this closure being here shown as a cap screw threaded onto the tube and provided with an opening 27 through which the outer portion of the driven member projects.

A pinion 28 is secured to the inner end of the driven member 19 for rotation therewith and, in the present instance, is shown as formed integral with the driven member. This driven pinion 28 is in constant mesh with the driving pinion 18 but it is held against axial movement, due to end thrust thereon, so as to prevent it from exerting any appreciable pressure on the driving pinion. For this purpose the driven pinion 28 and the casing are provided with opposed parts one of which has a projection in axial alinement with the driven member and having bearing contact with the other part, so as to function as a thrust bearing. In the particular construction here shown the angular portion of the casing, at the point of connection with the two tubular portions, is provided with an inwardly extending projection 29 which constitutes an abutment having a bearing surface in line with and transverse to the axis of the driven member 19 and the driven pinion is provided with an axial projection 30, the outer end portion, at least, of which is of small diameter and has a narrow, or substantially point, contact with the bearing surface of the casing projection 29. Preferably the projection 30 has a substantially semi-spherical end portion to engage the bearing surface of the part 29. The inwardly projecting part 29 of the casing may comprise a single piece but I prefer that the bearing surface for the axial projection on the driven pinion shall be renewable. I have therefore provided the casing with an opening 31 extending through the same and through the abutment 29 in axial alinement with the axial projection 30 on the driven pinion. A screw threaded bearing member 32 is mounted in this opening and is provided with means, such as a kerf 33, by which it may be adjusted from the exterior of the casing to position the inner or bearing end thereof with relation to the inner surface of the abutment 29 as a whole. The screw threaded bearing member 32, or at least the inner portion thereof, is hardened to provide the inner end thereof with a wear resisting bearing surface, but if and when this bearing surface becomes so worn as to cause friction the bearing member may be removed and renewed, either by replacing it with a new bearing member or by removing the worn end portion thereof by grinding, filing or the like, and then reinserting the same in the opening 31. The bearing member being here shown in the form of a headless screw it will be apparent that it can be inserted in the opening far enough to properly position the inner end thereof with relation to the axial projection on the driven pinion without projecting beyond the outer surface of the casing. In the present construction the inwardly extending projection 29 of the casing is spaced a short distance from the driving pinion 18 and, as above explained, this pinion is held by its shaft against axial movement and therefore cannot move into engagement with the projection 29, and the contact of the axial projection 30 of the driven pinion with the abutment prevents that pinion from exerting any appreciable pressure upon the driving pinion regardless of the amount of pressure which is exerted on the driven member.

The outer portion of the driven member 19 which projects beyond the tubular portion 7 of the casing may be provided with any suitable means for connecting the same with a working element or implement which is to be actuated thereby. In the present instance, it is provided with a tapered shank 34 by means of which the chuck 35 may be attached thereto.

It will be apparent from the foregoing description that the driving and driven members are mounted for free rotation within the casing and that little or no frictional resistance will be offered to their rotation regardless of the amount of pressure which may be exerted upon the driven member when the working element is forcibly pressed into engagement with the work. The axial projection on the driven pinion effectually prevents any inward axial movement of the driven member and therefore prevents the driven pinion from exerting pressure on the driving pinion. The several parts of the device are simple in construction and may be produced and assembled at a relatively low cost.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent is:

1. In an angle head for a tool, a casing having two tubular portions arranged at an angle one to the other, a driving member rotatably mounted in one of said tubular portions and including a pinion rigid therewith, a driven member rotatably mounted in the other of said tubular portions and including a pinion rigid therewith and meshing with the first mentioned pinion, said casing having at the junction of said tubular portions an integral abutment extending inwardly beyond the axis of said driving member, said abutment and the wall of said casing having an opening therethrough in alinement with the axis of said driven member, a bearing member rigidly supported in said opening and having at its inner end a substantially flat bearing surface adjacent the pinion of said driven member and transverse to the axis thereof, said bearing member also having means operable from the exterior of said casing whereby it may be adjusted toward and from the pinion of said driven member, the pinion of said driven member having an axial projection rigid therewith, tapered substantially to a point and having point contact with the flat bearing surface of said bearing member to provide a substantially frictionless thrust bearing for said driven member.

2. In an angle head for a tool, a casing having two tubular portions arranged at an angle one to the other, a driving shaft rotatably mounted in one of said tubular portions and held against axial movement therein, a beveled pinion rigid with the inner end of said shaft, the other tubular portion being of less length than the first mentioned tubular portion and having a greater internal diameter at its outer end than at its inner end, a driven member rotatably mounted in the last mentioned tubular portion, having longitudinal spaced diameters approximating the corresponding diameters of said tubular portion and having ball races, and bearing balls mounted in said races and engaging the wall of said tubular portion, a closure for the outer end of said tubular portion engaging the balls in one of said races and having an opening through which the outer portion of said driven member extends, and a pinion rigid with the inner end of said driven member and provided with an axial projection having a narrow end portion to contact a fixed part of said casing.

MELVORNE J. McCOMBS.